US00RE43367E

(19) United States
(12) Reissued Patent
Webster et al.

(10) Patent Number: US RE43,367 E
(45) Date of Reissued Patent: May 8, 2012

(54) POWER-BASED HARDWARE DIVERSITY

(75) Inventors: Mark A. Webster, Indian Harbour Beach, FL (US); Albert L. Garrett, Gadsden, AL (US); Steven D. Halford, Palm Bay, FL (US)

(73) Assignee: Intellectual Ventures I LLC, Wilmington, DE (US)

(21) Appl. No.: 12/322,659

(22) Filed: Feb. 5, 2009 (Under 37 CFR 1.47)

Related U.S. Patent Documents

Reissue of:
(64) Patent No.: 7,174,138
Issued: Feb. 6, 2007
Appl. No.: 10/922,985
Filed: Aug. 23, 2004

U.S. Applications:
(60) Provisional application No. 60/496,734, filed on Aug. 21, 2003.

(51) Int. Cl.
*H03C 7/02* (2006.01)
*H04B 1/02* (2006.01)
*H04B 7/02* (2006.01)

(52) U.S. Cl. ..... 455/101; 455/277.2; 375/347

(58) Field of Classification Search ..... 455/101, 455/132–136, 272, 277.1, 277.2, 232.1, 234.1, 455/234.2; 375/345, 347
See application file for complete search history.

(56) References Cited

U.S. PATENT DOCUMENTS

| | | | | |
|---|---|---|---|---|
| 5,809,090 | A * | 9/1998 | Buternowsky et al. | 375/347 |
| 5,963,874 | A | 10/1999 | Mahler | |
| 5,999,561 | A | 12/1999 | Naden et al. | |
| 6,151,372 | A | 11/2000 | Yamamoto | |
| 6,185,258 | B1 | 2/2001 | Alamouti et al. | |
| 6,493,399 | B1 | 12/2002 | Xia et al. | |
| 6,538,606 | B2 | 3/2003 | Quinn et al. | |
| 6,748,200 | B1 | 6/2004 | Webster et al. | |
| 6,842,421 | B1 | 1/2005 | Sarraf et al. | |
| 2002/0101378 | A1 | 8/2002 | Quinn | |
| 2003/0190903 | A1 | 10/2003 | Melamed | |
| 2004/0014431 | A1 | 1/2004 | Lo | |
| 2004/0125869 | A1 | 7/2004 | May et al. | |
| 2004/0242277 | A1 | 12/2004 | Kiribayashi et al. | |
| 2004/0266374 | A1 | 12/2004 | Saed et al. | |

* cited by examiner

*Primary Examiner* — Nguyen Vo

(57) ABSTRACT

A power-based hardware antenna diversity method for a wireless transceiver with multiple antennas is disclosed. The method is characterized in the steps of setting the transceiver gain at a maximum level to establish a first story of dynamic power range above a noise floor level, using a high-resolution ADC at a large back-off level relative to the noise floor to detect weak signals within the first story of the dynamic power range, switching antennas and measuring power level for each antenna during signal onset, and selecting an antenna having a largest power level.

27 Claims, 4 Drawing Sheets

POWER-BASED HARDWARE DIVERSITY

Matter enclosed in heavy brackets [ ] appears in the original patent but forms no part of this reissue specification; matter printed in italics indicates the additions made by reissue.

CROSS-REFERENCE TO RELATED APPLICATIONS

The present application claims priority to provisional application No. 60/496,734, entitled "Power-Based Hardware Diversity" filed on Aug. 21, 2003, which is herein incorporated by reference for all intents and purposes related.

BACKGROUND OF THE INVENTION

Field of the Invention

The present invention relates to wireless communications, and more particularly to a packet-by-packet power based hardware diversity scheme for selecting one of multiple antennas to reduce the probability of poor reception and improve reliability.

BRIEF DESCRIPTION OF THE DRAWINGS

The benefits, features, and advantages of the present invention will become better understood with regard to the following description, and accompanying drawings where.

DETAILED DESCRIPTION OF THE DISCLOSURE

Figure 1:
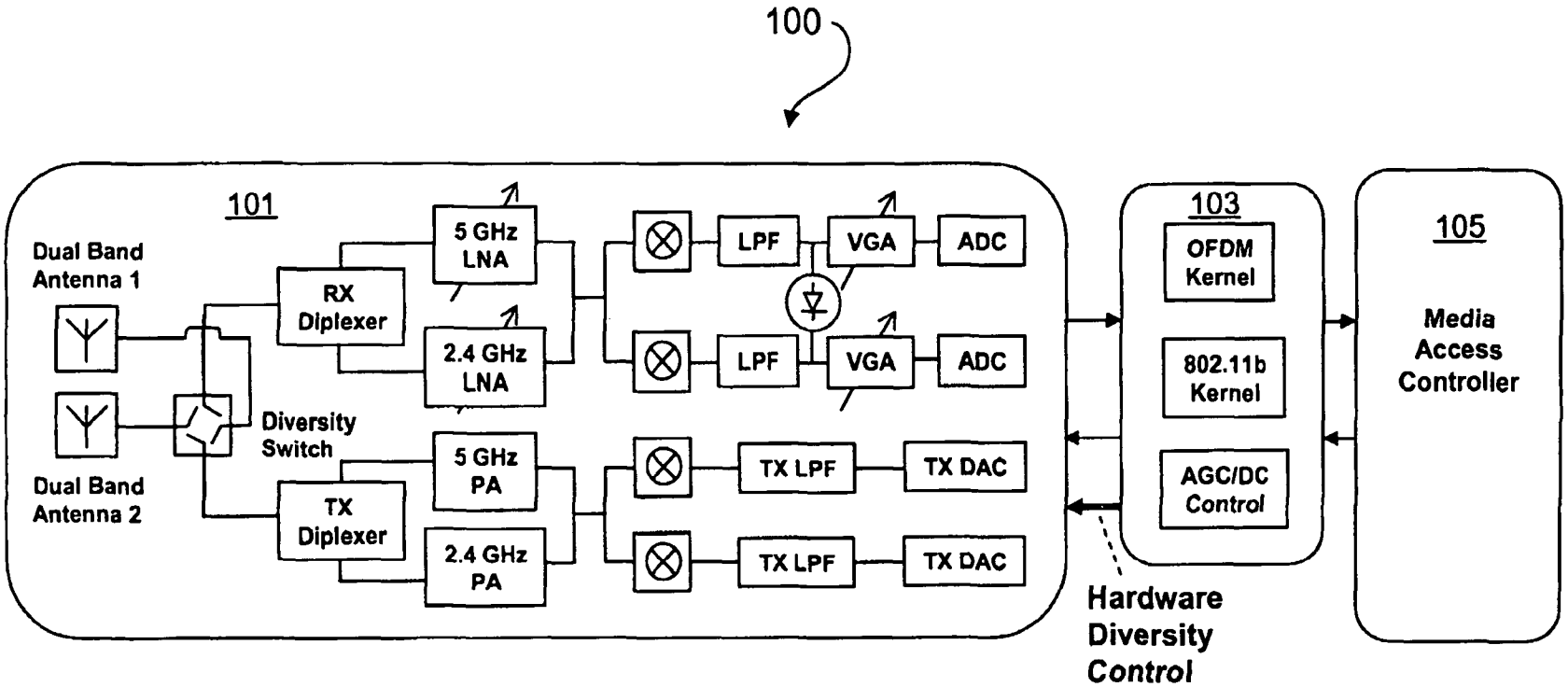
FIG. 1 is a simplified block diagram of a wireless transceiver implemented according to an exemplary embodiment of the present invention.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Antenna diversity provides increased reliability to a communication link for transceivers with multiple antennas in which each antenna "sees" different channels. Diversity reduces the probability of poor reception by instantaneously selecting the best antenna for each packet. Two types of antenna diversity are known, including those based in firmware and those based in hardware. Firmware diversity may be implemented in the media access controller (MAC) in which the antenna is selected according to some algorithm implemented in firmware based on a packet error metric, such as packet error rate (PER) or the like. Firmware diversity methods are relatively slow and are effective for relatively simple and static environments. For example, the antenna decision is not made on a packet-by-packet basis but is instead made on a cumulative packet metric over multiple packets, such as when the PER becomes unacceptable over time.

Hardware diversity is relatively fast and makes antenna decisions using high-speed hardware techniques. An antenna decision is made every received packet (packet-by-packet) in which two or more antennas are examined during the front part of the preamble of each packet. The preferred antenna is selected for use over the rest of the packet. The antenna decision is made based on one or more hardware diversity metrics, including power or the Received Signal Strength Indicator (RSSI), signal-to-noise ratio (SNR), multipath or any suitable combination thereof. A power- or RSSI-based solution chooses the antenna with best signal strength; an SNR-based solution chooses the antenna with the best SNR; a multipath-based solution chooses the antenna with most benign multipath characteristic. The noise associated with the SNR-based schemes can be thermal (e.g., radio generated) or caused by interference, such as by other radio frequency (RF) sources. The power-based scheme is generally the same as SNR if the noise is the same on all antennas.

Utilization of each metric provides some degree of improved reliability. Multipath schemes reduce the amount of "echo" distortion on the signal provided to the receiver. Power-based schemes increase average power provided to the receiver, and are most effective when a communication link is SNR-limited (e.g., not multipath limited) and in which the noise is about the same on all of the antennas. Assume, for example, that a receiver needs approximately 10 decibels (dB) SNR for reliable performance so that the packet must be at least 10 dB above the noise floor for reliable detection and reception. If the SNR level of each antenna is different, then selecting the antenna with the highest SNR increases the SNR provided to the baseband (BB) processor. The improvement in link performance, however, depends upon whether the communication link is SNR limited or not. If the link is SNR-limited (e.g., rather than multipath interference limited), then power-based hardware antenna diversity improves link performance.

The present invention is described in relation to a transceiver 100 (FIG. 1) configured in a Zero Intermediate Frequency (ZIF) architecture for use in a wireless local area network (WLAN) in accordance with any one or more of the family of IEEE 802.11 standards, such as 802.11a, 802.11b, 802.11g, etc. It is understood, however, that the present invention is not limited to ZIF architectures or WLAN configurations or 802.11 operations, but instead may be employed in other types of radio or wireless communications for other types of applications. A ZIF architecture, otherwise known as direct conversion, is a wireless transceiver implementation that is utilized to obtain sufficient performance and higher data throughput at lower cost and power consumption by eliminating IF components and external filters. The target carrier frequencies are in the gigahertz (GHz) range, such as for example, the 2-5 GHz range and higher, although the present invention is not limited to any particular frequency range.

It is desired to use hardware diversity to make diversity decisions on a packet-by-packet basis using packet preambles since the 802.11 protocol is contention-based in which packets can arrive on a random basis from any direction at any time. Firmware-based diversity cannot handle these situations. Hardware diversity schemes have been designed for single-IF (intermediate frequency) (or non-ZIF) 802.11b radios. Hardware diversity is more difficult to implement, however, for radios that operate at higher data rates and/or that employ the ZIF architecture. There is very little time available during the packet preamble of an orthogonal frequency division multiplexing (OFDM) packet used by transceivers operating according to the IEEE 802.11a or 802.11g standards as compared to the time available during the packet preamble of an 802.11b packet.

The time problem is exacerbated when operating with a ZIF architecture, which suffers from excessive DC components. The DC voltage levels can become excessively large in the ZIF radio, so that the signals of interest become temporarily invisible and difficult to detect and acquire. The primary problem with the ZIF architecture is the development of DC offsets at baseband that degrade SNR, which is directly related to performance of the system. All of the sources of DC offset may be referenced to the input of the baseband amplifier in the baseband signal path of the receive signal processing chain. The gain range of the baseband amplifier must be sufficient to guarantee acceptable performance in a variety of environments.

The gain range of traditional baseband amplifiers has been configured to operate at gain levels over 50 dB, for example, which was believed necessary to obtain the desired operating range. It has been determined, however, that at such high gains (50 dB or more), gain changes of as little as 10 dB can cause an increase of DC level from essentially 0 to 3 V or more. The analog to digital converter (ADC), however, is generally limited to a relatively small voltage range (e.g., approximately 0.5 V), so that excessive DC overwhelms (e.g., saturates) the ADC and causes potential operation failure. For a radio implemented according to the IEEE 802.11a standard, for example, the maximum allowed time to measure and eliminate DC is about 5 to 6 microseconds (μs). The AGC procedure must be configured to conserve time, which is a valuable commodity in a wireless transceiver.

Figure 3:
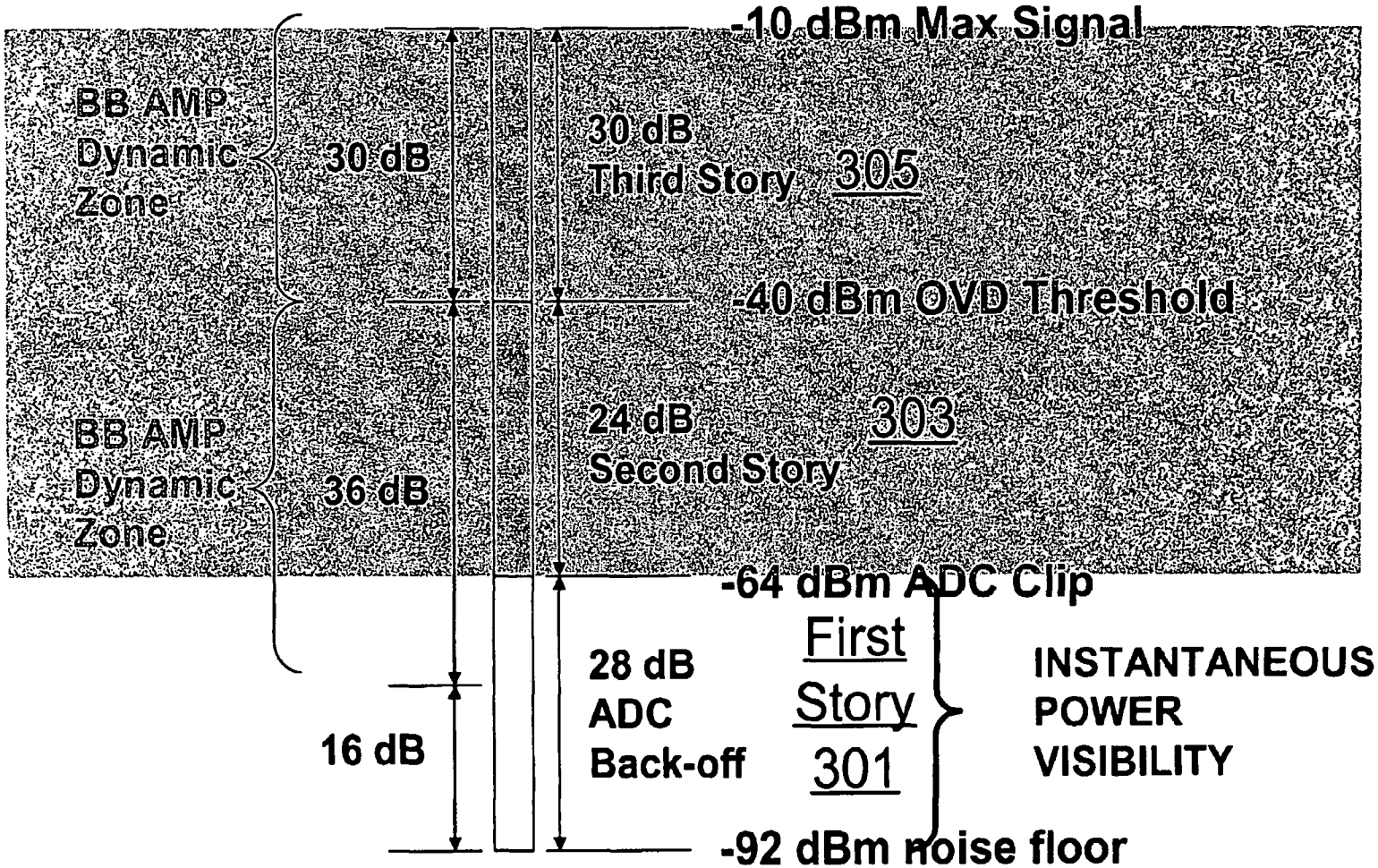
FIG. 3 a figurative diagram illustrating exemplary division of the dynamic power range or spectrum of the transceiver of FIG. 1.

The present disclosure describes a packet-by-packet power-based hardware antenna diversity scheme that is useful for radios implemented using a ZIF architecture and that operate according to any of the IEEE 802.11 standards, including 802.11a and 802.11g using OFDM. Such WLAN radios typically have a relatively large dynamic range, such as, for example, a dynamic power range from approximately −92 dBm (decibels above or below 1 milliwatt) to approximately −10 dBm. It is determined that providing a power-based hardware diversity scheme over the full dynamic power range is not necessary. Instead, the full dynamic range is divided into three ranges or power stories for acquisition including a 30 dB range first story 301 (FIG. 3). During noise floor tracking, the gain is limited to a maximum value and the ADC back-off is large and provides power visibility within this entire 30 dB range down to the noise floor. There is less of a need to switch the antenna if the signal power is significant (e.g., above the back-off range of the ADC causing ADC clipping).

FIG. 1 is a simplified block diagram of a wireless transceiver 100 implemented according to an exemplary embodiment of the present invention. The transceiver 100 is configured for dual-band operation in which it can operate at 2.4 GHz for 802.11b or 802.11g or 5 GHz for 802.11a. The transceiver 100 includes a radio 101, a baseband processor 103, and a MAC 105. The radio 101 generally converts between RF and baseband, and the baseband processor 103 converts between baseband data and MAC packets provided from, or otherwise for processing by, the MAC 105. The transceiver 100 includes at least two antennas, where it is understood that any number of antennas is contemplated. The antennas are coupled to a diversity switch within the radio 101, where the diversity switch is further coupled to an RX diplexer for receive operations. The RX diplexer is coupled to a 5 GHz low-noise amplifier (LNA) for 5 GHz operation according to 802.11a and to a 2.4 GHz LNA for 2.4 GHz operation according to either 802.11b or 802.11g. The LNAs are both coupled to in-phase (I) and quadrature-phase (Q) channel mixers, low pass filters (LPFs), variable gain amplifiers (VGAs) and corresponding ADCs.

The radio 101 further includes a pair of transmit (TX) digital to analog converters (DACs) respectively coupled to a pair of TX LPFs, which are further respectively coupled to a pair of transmitter mixers for up-conversion to RF. The I and Q channel transmit RF signals are each provided to a 5 GHz power amplifier (PA) for 802.11a and 802.11g modes and a 2.4 GHz PA for 802.11b mode. The 5 and 2.4 GHz PAs are coupled to a TX diplexer, which is coupled to the antenna diversity switch. The baseband processor 103 includes an OFDM processor or kernel for 802.11a or 802.11g operation, an 802.11b kernel, and AGC/DC control logic. As shown, the baseband processor 103 asserts a hardware diversity control signal to the radio 101 for selection of an antenna via the diversity switch. The diversity control signal directly or indirectly (e.g., via a register or the like) controls the diversity switch for controlling selection of one of the antennas. Although only two antennas are shown, it is understood that any number of antennas may be employed.

Figure 2:
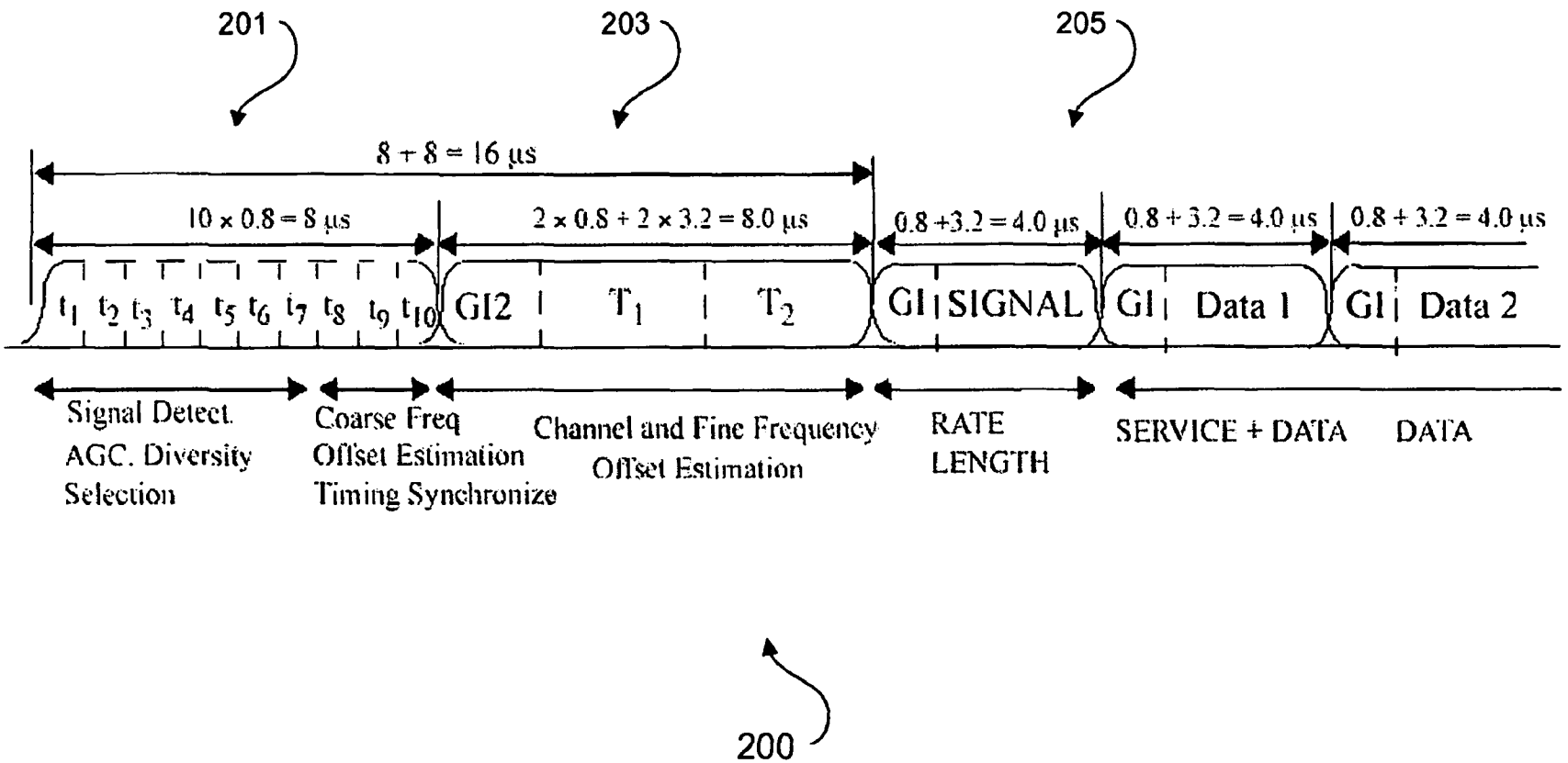
FIG. 2 is a figurative diagram of a portion of an OFDM packet symbol structure with a preamble as provided in the IEEE 802.11a standard.

FIG. 2 is a figurative diagram of a portion of an OFDM packet symbol structure 200 with a preamble as provided in the IEEE 802.11a standard. The standard OFDM packet symbol structure 200 includes a short sync (SS) section 201, followed by a long sync (LS) section 203, followed by remaining packet portions 205 (only partially depicted). The SS section 201 includes 10 consecutive short syncs labeled t1, t2, t3, . . . , t10 each being 800 nanoseconds (ns) in duration for a total of 8 microseconds (Rs). The LS section 203 includes a 1.6 μs guard interval GI2 followed by a pair of 3.2 μs long syncs labeled T1 and T2. In accordance with a standard time budget, signal detect, AGC and antenna diversity functions are allotted to occur during the first 7 short syncs or within 5.6 μs of packet onset, which is insufficient time for antenna diversity. The course frequency offset (CFO) estimation and timing synchronization functions normally occur during the last 3 short syncs between 5.6 and 8 μs. The channel and fine frequency offset (FFO) estimation normally occur during the LS section 203.

FIG. 3 a figurative diagram illustrating exemplary division of the dynamic power range or spectrum of the transceiver 100. The dynamic spectrum has a noise floor at approximately −92 dBm, which defines the bottom or floor of a 28 dB first story 301 from −92 dBm to approximately −64 dBm. A 24 dB second story 303 is defined between approximately −64 dBm to approximately −40 dBm and a 30 dB third story 305 is defined between approximately −40 dBm to approximately −10 dBm. After each packet ends, the AGC/DC control circuit of the transceiver 100 re-acquires the noise floor and waits for the onset of the next packet. The baseband amplifiers (e.g., including the radio VGAs) are set to a maximum of about 40 dB (assuming the noise floor is within the first story 301) so that the radio ADCs have an equivalent noise floor value roughly at about the −92 dBm noise floor level. The ADCs have a relatively large operating range of about 30 dB and thus have instantaneous power visibility of the entire power range of the first story 301. This corresponds to a rather large ADC back-off setting of the ADCs of approximately 28 dB spanning the first story 301. A normal back-off level, for example, is about 12 dB, which is otherwise desirable for lower-resolution ADCs.

The resolution or number of bits of the ADCs depend upon the particular configuration and expected signal types to be received. For example, in an 802.11a application, the ADCs are sized to sufficiently distinguish 64 quadrature amplitude modulation (QAM) signals which typically require relatively large SNR (e.g., such as an SNR greater than 18 dB). In the embodiment shown in which 802.11a and 802.11g signal types are contemplated, the ADCs includes 8-10 actual bits, although it is appreciated by those of ordinary skill in the art that the "effective" number of bits may be less, such as 7 effective bits or the like.

After acquiring the noise floor, the transceiver 100 measures the power level of the wireless medium over predetermined time intervals, such as, for example, 800 ns time intervals. An increase in power level indicates the onset of a packet in the wireless medium. The radio includes an over-voltage or over-power detector that has an OVD threshold approximately at the −40 dBm level (threshold between the second story 303 and the third story 305) when the baseband amplifiers are set to a predetermined maximum level of approximately 40 dB. At this level, the ADCs have a maximum level or window set approximately at the −64 dBm level (threshold between the first story 301 and the second story 303). In this manner, a packet having a very strong power level exceeding the OVD threshold and causing an OVD signal indicates that the power range of the signal is within the third story 305. A signal that does not exceed the OVD threshold but that causes clipping of the ADCs indicates that the power range of the signal is within the second story 303. An increase in the power level by a predetermined amount above the tracked noise floor level, such as a power rise of between 4-6 dB, but that does not cause clipping of the ADCs indicates a relatively weak signal within the first story 301.

It is appreciated that operation in the first story 301 is unique to operation in the other two stories 303 and 305. The ADC back-off for the first story 301 is relatively large and provides power visibility over the entire power range of the first story 301. The signal power back-off into the ADCs can be as large as 30 dB with reliable reception. This provides a rather large power aperture for fast antenna diversity scanning. As previously described, for OFDM-type packets, the normal time budget allows only up to about 5-6 μs of preamble for AGC and antenna diversity. Furthermore, ZIF-based AGC/DC algorithms must contend with changing DC versus gain. The relatively high resolution ADCs help to mitigate the DC issue. High resolution ADCs provide wide signal gain aperture for weak to strong signals. The high resolution of the ADCs is exploited allowing limiting the maximum baseband amplifier gain (e.g., max of 40 dB) and utilizing a large signal back-off for weak signals. Limited gain reduces the DC budget with which the AGC functions must contend. The high resolution of the ADCs results in a relatively broad visibility of the AGC, so that the AGC can instantaneously see signals over a larger dynamic range.

In particular, the large visibility of the ADCs enable instantaneous power observations over a power range of up to 30 dB above the −92 dBm noise floor, or up to approximately −62 dBm. It has been determined that this is the beneficial region for power-based hardware diversity. The spectral limit for receiver sensitivity of a 54 megabit per second (Mbps) signal is −65 dBm. Signals with greater power levels operative within the second or third stories 303, 305 are detected and acquired with either antenna so that diversity is less of an issue. At the weaker power levels of the first story 301, however, antenna selection is most beneficial.

Figure 4:
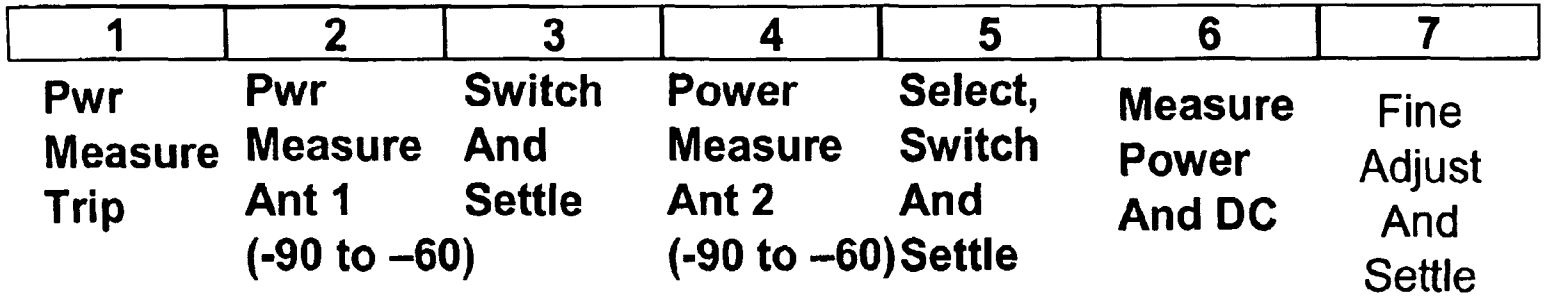
FIG. 4 is a figurative diagram of an exemplary timeline illustrating antenna measurement and selection within the SS section of an incoming packet for two antennas.

FIG. 4 is a figurative diagram of an exemplary timeline illustrating antenna measurement and selection within the SS section 201 of an incoming packet for two antennas 1 and 2. Each block represents an 800 ns timing interval. The timeline is initiated at a first block 1 indicating a power level measure trip in which the transceiver 100 detected a rise in the power level relative to the measured noise floor by the threshold amount. In an exemplary embodiment, for example, the threshold power level differential is approximately 4-6 dB indicative of the presence of a packet, so that any rise in power level above the threshold initiates AGC and antenna diversity selection. It is noted, however, that if the signal power level is significant enough to cause clipping of the ADCs and/or the OVD condition, that the antenna diversity functions may be considered unnecessary.

At next block 2, the transceiver 100 measures the power level using a first antenna 1 assuming a power level range between approximately −92 to −62 dBm. At next block 3, the transceiver 100 switches to antenna 2, switches DC compensation level for antenna 2, and allows any transients to settle. At next block 4, the transceiver 100 measures the power level using antenna 2. At next block 5, the transceiver 100 selects the antenna having the higher power level, switches the antenna and DC compensation, if necessary, and allows transient settling. At next block 6, the transceiver 100 measures the power level and the DC level using the selected antenna for fine gain and DC adjustments. At next block 7, the transceiver 100 performs fine gain and DC adjustments based on measured power and DC levels, and allows transients to settle. In one embodiment, for example, the gain of a digital feed-forward gain amplifier (not shown) is determined for fine gain adjust. The equivalent duration for hardware diversity selection is 5.6 μs corresponding to 7 short syncs, which is within the allocated time budget.

Figure 5:
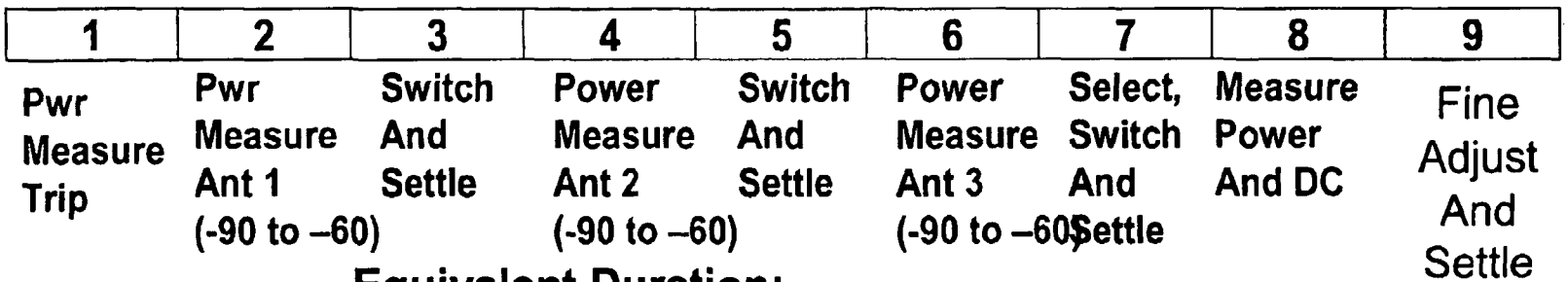
FIG. 5 is a figurative diagram of an exemplary timeline illustrating antenna measurement and selection within the SS section of an incoming packet for 3 antennas.
Figure 4:
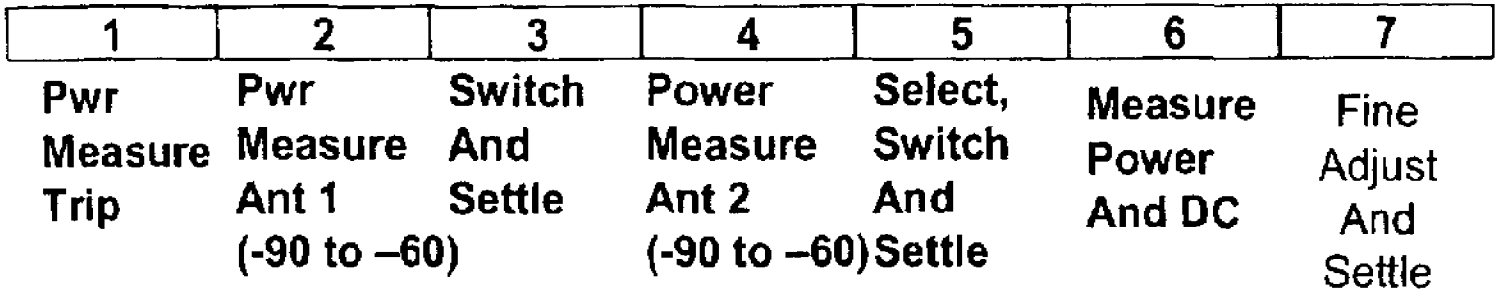
Figure 5:
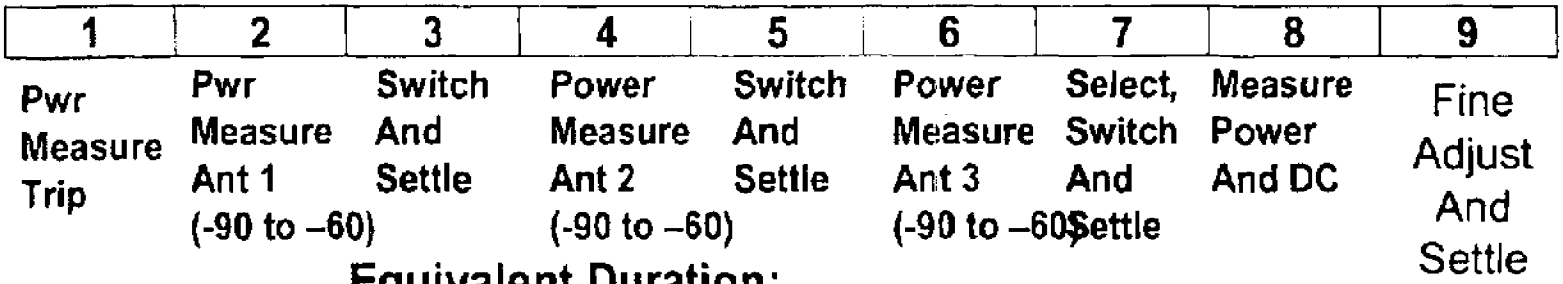

FIG. 5 is a figurative diagram of an exemplary timeline illustrating antenna measurement and selection within the SS section 201 of an incoming packet for 3 antennas. The power measure trip occurs in block 1 and a power measurement is taken using antenna 1 in block 2. In block 3, the transceiver 100 switches to antenna 2 and switches DC compensation level appropriate for antenna 2 and allows transients to settle. At next block 4, a power level measurement is taken using antenna 2. At next block 5, the transceiver 100 switches to antenna 3 and switches DC compensation level appropriate for antenna 3 and allows transients to settle. At next block 6, a power level measurement is taken using antenna 3. At next block 7, the transceiver 100 selects the antenna with the highest power level, switches the antenna and corresponding DC compensation level, if necessary, and allows transient settling. At next block 8, the power and DC levels are measured using the selected antenna. At next block 9, the transceiver 100 performs fine adjust and settling as previously described. The equivalent duration for hardware diversity selection in this case is approximately 7.2 μs corresponding to 9 short syncs. In this case, the time budget of the acquisition process is modified to a maximum time budget range of about 10 short syncs or about 8 μs.

As described above, utilizing the full capability of the ADC to provide large signal back-offs provides increased visibility. An alternative method for increased visibility is to stack the ADCs to effectively double the cumulative visibility of the AGC. At baseband, there are two ADCs including an I-channel ADC and a Q-channel ADC. In this case, one of the ADCs, such as the I-channel ADC, is set at a gain level to monitor the first story 301 of the dynamic power range. The other ADC is set at a different gain level to monitor the second story 303 dynamic range.

The fundamental issues when switching antennas include transients induced by antenna switching, DC changes due to new signal path, and gain changes due to new signal path. A few issues that enable success of power-based, hardware diversity for OFDM WLANs with ZIF include the ability of the baseband AGC to see the dynamic range of interest in minimal time, the elimination of DC in minimum time, mitigation techniques for DC changes with antenna switching, and mitigation techniques for gain changes with antenna switching. In another embodiment, the AGC time budget is re-allocated to provide more time and/or to enable diversity among 3 or more antennas.

It is noted that DC elimination is important to maintaining signal visibility at baseband in ZIF implementations. DC budgets indicate that DC could change significantly as a result of antenna switching. A significant amount of unexpected DC can saturate the ADC regardless of the actual power level of the signal, which would otherwise require time to track out and resolve. There may not be enough time for hardware diversity to resolve unexpected DC. In one embodiment, the amount of DC correction is predetermined and known at the time of antenna switching. In this case, the transceiver 100 is able to switch the antenna while immediately applying a new, predetermined DC correction term. The DC DACs (not shown) are essentially instantaneous and thus allow for instantaneous changes in DC correction without significant delays. In one embodiment, relatively large DC DACs (e.g., 12-bit DACs) are employed to handle a wide range of DC offsets. Settling through the radio is very quick. If a high-pass filter (HPF) is employed, however, the bandwidth-dependent settling time must be accounted for during each switch, so that settling time may consume too much time.

A first approach for DC compensation is calibration at time of manufacture to determine the DC levels for each antenna path. This method suffers, however, over time from errors due to factors such as drift, aging, heat, etc. Alternatively, an antenna DC table is dynamically maintained during radio operation storing a DC value for each antenna. Alternating between the antennas allows maintenance/updating of the measured DC values stored in the antenna DC table. In one embodiment, the DC values are measured during noise tracking while receiving noise level in the absence of a packet. The DC through one of the antennas is measured while tracking noise, and the transceiver 100 switches to the other antenna while idle to determine the DC on the other path. The rate at which the antennas are visited is based on expected DC versus time characteristic.

In a more specific embodiment, the DC per antenna is determined at end-of-packet (EOP) (e.g., just after completion of a packet transmission in the wireless medium). At EOP, the AGC performs stepped-gain descent to acquire the noise floor to determine DC. At this gain level, the EOP alternates between the antennas to determine the DC level for each antenna. The measured DC values are stored in the antenna DC table. The stored DC values are used by the hardware to correct DC instantaneously when switching antennas during packet onset.

Gain variations associated with antenna switching are more stable. Antenna switches typically have different loss characteristics between signal paths, which are relatively stable over time. Measurement at time of manufacture provides calibration data for antenna power measures, which may be stored (e.g., in a look-up table) and used during gain switching. In an alternative embodiment, the gain and/or noise floor difference between the antennas is measured for each antenna. For example, the noise floor is measured for each antenna and the corresponding gain values are used to determine the relative gain differences based on measured noise floor differences. In one embodiment, for example, the gain per antenna is maintained by alternating between antennas while receiving noise. In a more particular embodiment, the gain per antenna is maintained by alternating between antennas and measuring gain after EOP.

Normally, the AGC and diversity functions are allotted approximately 5.6 μs from the onset of a packet. The final 2.4 μs is allocated to CFO acquisition, which relieves the processing required for LS processing. The long sync time estimation and the FFO estimation each only have to handle approximately +/−156 kilohertz (kHz). In an alternative embodiment, the AGC is allocated the full 8 μs of the SS section 201 if the long sync processing instead handles an offset of approximately +/−276 kHz. In particular, the long sync correlator is modified to a bank of correlators, such as, for example, at least two correlators. In the two correlator configuration, each is tuned to a different frequency offset, such as, for example, +120 kHz and −120 kHz, and each handles an offset range of approximately +/−156 kHz. In this manner, each correlator handles an offset range of +/−156 kHz relative to its frequency offset position (+120 kHz or −120 kHz), for a combination frequency range of approximately +/−276 kHz. The outputs of the two offset correlators are used to determine the frequency offset within +/−276 kHz. For example, the outputs are combined to interpolate or otherwise extrapolate the CFO estimation within the +/−276 kHz range. The CFO estimation may be performed at the beginning of the LS section 203 including overlapping the GI2 guard interval. The FFO estimation operates as normal and can be completed within the remaining time of the LS section 203.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A power-based hardware antenna diversity method for a wireless transceiver with multiple antennas, comprising:

setting gain at a maximum level to establish a first story of dynamic power range above a noise floor level;

[using a high-resolution ADC at a large back-off level relative to the noise floor to detect]*detecting* weak signals within the first story of the dynamic power range;

switching antennas and measuring power level for each antenna during signal onset; and selecting an antenna having a largest power level.

2. The power-based hardware antenna diversity method of claim 1, further comprising:

measuring a DC characteristic for each antenna;

storing each measured DC characteristic; and applying a corresponding DC characteristic during said step of switching antennas and measuring power level for each antenna.

3. The power-based hardware antenna diversity method of claim 2, wherein said measuring comprises measuring at EOP.

4. The power-based hardware antenna diversity method of claim 1, further comprising measuring gain characteristics of each antenna and storing corresponding gain mitigation values.

5. The power-based hardware antenna diversity method of claim 1, further comprising measuring relative noise floor gain differences between each antenna and storing corresponding gain mitigation values.

6. The power-based hardware antenna diversity method of claim 1, further comprising employing at least two long sync correlators for performing course frequency offset estimation at the beginning of a long sync section of an incoming packet.

7. A method for performing hardware diversity based on power in a wireless transceiver having multiple antennas, comprising:

setting a transceiver gain at a maximum level to establish a first story of dynamic power range above a noise floor level;

[using a high-resolution ADC at a large back-off level relative to the noise floor to detect] *detecting* weak signals within the first story of the dynamic power range;

switching antennas and measuring power level for each antenna during signal onset; and selecting an antenna having a largest measured power level.

8. The method of claim 7, further comprising:

measuring a DC characteristic for each antenna;

storing each measured DC characteristic in a memory; and for each antenna, applying a corresponding DC characteristic during said step of measuring the power level.

9. The method of claim [7] *8*, wherein said measuring comprises measuring at EOP.

10. The method of claim 7, further comprising measuring gain characteristics of each antenna and storing corresponding gain mitigation values in a memory.

11. The method of claim 7, further comprising measuring relative noise floor gain differences between each antenna and storing corresponding gain mitigation values in a memory.

12. The method of claim 7, further comprising employing at least two long sync correlators for performing course frequency offset estimation at the beginning of a long sync section of an incoming packet.

*13. The power-based hardware antenna diversity method of claim 1, further comprising:*

*setting gain at a second maximum level different from the first maximum gain level to establish a second story of dynamic power range above the first story; and*

*using one or more second high-resolution ADCs to detect signals within the second story of the dynamic power range.*

*14. A wireless communications device for communicating over a wireless medium, the device comprising:*

*a plurality of antennas,*

*a baseband processor configured to generate a hardware diversity control signal to select one or more of the plurality of antennas;*

*a receiver selectively coupled to the plurality of antennas based at least in part on the hardware diversity control signal and having a dynamic range between a largest expected input signal power level and a minimum noise floor power level;*

*one or more amplifiers coupled to the receiver and configured at a first maximum gain level to establish a first story of dynamic power range above a noise floor level as a sub-range of the dynamic range; and*

*one or more analog to digital converters (ADCs) coupled to the one or more amplifiers and configured to detect signals within the first story of dynamic power range;*

*wherein the baseband processor is further configured to, upon onset of a data packet signal, determine whether the data packet signal causes an over power signal condition in the one or more amplifiers indicating a signal power level above the first story, determine whether the data packet signal causes a clipping signal condition in the one or more ADCs indicating a signal power level above the first story, and if no over power signal condition or clipping signal condition is present, determine that the power level of the data packet signal is within the first story of the dynamic power range and switch to another of the plurality of antennas to measure a power level during packet onset.*

*15. The device of claim 14, wherein the baseband processor is further configured to:*

*measure a DC characteristic for each antenna;*

*store each measured DC characteristic in a memory; and*

*apply a corresponding DC characteristic when measuring the power level for the corresponding antenna.*

*16. The device of claim 15, wherein the baseband processor is configured o measure the DC characteristic for each antenna at end of packet (EOP).*

*17. The device of claim 14, wherein the baseband processor is configured to measure gain characteristics of each antenna and store corresponding gain mitigation values in a memory.*

*18. The device of claim 14, wherein the baseband processor is configured to measure relative noise floor gain differences between each antenna and store corresponding gain mitigation values in a memory.*

*19. The device of claim 14, further comprising at least two long sync correlators for performing course frequency offset estimation at the beginning of a long sync section of the onset data packet.*

*20. The device of claim 14, further comprising:*

*one or more second amplifiers cooled to the receiver and configured at a second maximum gain level different from the first maximum gain level to establish a second story of dynamic power range above the first story, and*

*one or more second analog to digital converters (ADCs) coupled to the one or more second amplifiers and configured to detect signals within the second story of dynamic power range.*

*21. A method, comprising:*

*detecting receipt of a data packet signal via at least one of a plurality of antennas;*

*setting gain of one or more amplifiers coupled to the at least one of the plurality of antennas at a first maximum level to establish a first story of dynamic power range above a noise floor level as a sub-range of a larger dynamic range supported by the wireless transceiver,*

*determining whether a signal power level is above the first story by detecting if the data packet signal causes an over power signal in the one or more amplifiers;*

*detecting signals within the first story of the dynamic power range;*

*determining whether the signal power level is above the first story by detecting a clipping signal condition; and*

*measuring the signal power level upon data packet receipt using another antenna of the plurality of antennas if the power level of the data packet signal is within the first story power range, and if no over power signal condition or clipping signal condition is met.*

*22. The method of claim 21, further comprising:*

*measuring a DC characteristic for each antenna;*

*storing each measured DC characteristic in a memory; and*

*applying a corresponding DC characteristic when measuring the power level for the corresponding antenna.*

*23. The method of claim 22, wherein the step of measuring the DC characteristic for each antenna occurs at end of packet (EOP).*

*24. The method of claim 21, further comprising measuring gain characteristics of each antenna and storing corresponding gain mitigation values in a memory.*

*25. The method of claim 21, further comprising measuring relative noise floor gain differences between each antenna and storing corresponding gain mitigation values in a memory.*

*26. The method of claim 21, further comprising employing at least two long sync correlators for performing course frequency offset estimation at the beginning of a long sync section of the onset data packet.*

*27. The method of claim 21, further comprising:*

*setting gain of one or more second amplifiers coupled to the at least one of said antennas at a second maximum level different from the first maximum gain level to establish a second story of dynamic power range above the first story; and*

*using one or more second high-resolution ADCs to detect signals within the second story of the dynamic power range.*

* * * * *

UNITED STATES PATENT AND TRADEMARK OFFICE

CERTIFICATE OF CORRECTION

PATENT NO. : RE43,367 E
APPLICATION NO. : 12/322659
DATED : May 8, 2012
INVENTOR(S) : Webster et al.

It is certified that error appears in the above-identified patent and that said Letters Patent is hereby corrected as shown below:

In the drawings, Fig. 4 & 5 should be replaced with the corrected Fig 4 & 5 as shown on the attached page.

In Fig. 4, Sheet 4 of 4, delete "0.8 usecs= 5.6 usecs" and insert -- 0.8 µsecs= 5.6 µsecs --, therefor.

In Fig. 5, Sheet 4 of 4, delete "0.8 usecs= 7.2 usecs" and insert -- 0.8 µsecs= 7.2 µsecs --, therefor.

In the Specifications

In Column 4, Line 40, delete "(Rs)." and insert -- (µs). --, therefor.

In the Claims

In Column 10, Line 25, in Claim 16, delete "o" and insert -- to --, therefor.

In Column 10, Line 40, in Claim 20, delete "cooled" and insert -- coupled --, therefor.

Signed and Sealed this
Twenty-first Day of May, 2013

Teresa Stanek Rea

Teresa Stanek Rea
*Acting Director of the United States Patent and Trademark Office*